(12) United States Patent
Wires et al.

(10) Patent No.: US 11,714,732 B1
(45) Date of Patent: Aug. 1, 2023

(54) GRANULAR TRACKING OF REPLICATION CONSISTENCY USING SUBSETS OF ASYNCHRONOUS REPLICATION TASKS

(71) Applicant: Amazon Technologies, Inc., Seattle, WA (US)

(72) Inventors: Jacob Wires, Vancouver (CA); Julien Mascart, Vancouver (CA); Valeri Atamaniouk, Vancouver (CA); Jun Dai, Burnaby (CA); Sidharth Bajaj, Vancouver (CA); Wesley Shawn Davis, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 190 days.

(21) Appl. No.: 17/038,212

(22) Filed: Sep. 30, 2020

(51) Int. Cl.
*G06F 11/20* (2006.01)
*G06F 11/34* (2006.01)
*G06F 9/48* (2006.01)
*H04L 45/021* (2022.01)
*G06F 11/07* (2006.01)

(52) U.S. Cl.
CPC .......... *G06F 11/2074* (2013.01); *G06F 9/4887* (2013.01); *G06F 11/0715* (2013.01); *G06F 11/3409* (2013.01); *H04L 45/021* (2013.01); *G06F 2201/855* (2013.01)

(58) Field of Classification Search
CPC .............. G06F 11/2074; G06F 11/0715; G06F 11/3409; G06F 9/4887; G06F 2201/855
See application file for complete search history.

(56) References Cited

U.S. PATENT DOCUMENTS

| | | | | |
|---|---|---|---|---|
| 3,583,327 | A * | 6/1971 | Arndt | .................... E01B 23/02 104/120 |
| 7,908,449 | B2 * | 3/2011 | Satoyama et al. | .. G06F 11/2082 711/163 |
| 8,073,922 | B2 | 12/2011 | Bates | |
| 8,301,593 | B2 * | 10/2012 | Hoffmann et al. | .. G06F 11/2094 707/658 |
| 8,316,198 | B2 | 11/2012 | Hirakawa et al. | |
| | | (Continued) | | |

OTHER PUBLICATIONS

Routing - Wikipedia; Aug. 18, 2020 (Year: 2020).*
(Continued)

*Primary Examiner* — Ramon A. Mercado
(74) *Attorney, Agent, or Firm* — S. Scott Foster; Kowert, Hood, Munyon, Rankin & Goetzel, P.C.

(57) ABSTRACT

Sets of asynchronous replication operations may be tracked to ensure consistency. A tracking service may receive notifications of pending asynchronous replication tasks, and responsive to receiving a manifest indicating a request to be notified upon completion of a set of pending replication asynchronous tasks, matches individual ones of the tasks within the set to tasks indicated as pending. The tracking service may then select a routing table based on a most recent sequence number associated with the set of tasks, determine one or more tracking nodes assigned to track the set of tasks, and send the manifest to each of the tracking nodes. As individual ones of the tasks complete, notifications of completion may be sent to the tracking nodes and an aggregator node aggregates the completion notifications for the set. Once all completion notifications are received, a response to the request indicating completion may be sent.

20 Claims, 7 Drawing Sheets

(56) References Cited

U.S. PATENT DOCUMENTS

| | | | |
|---|---|---|---|
| 8,631,284 B2* | 1/2014 | Stevens | G06F 13/24 |
| | | | 714/48 |
| 8,793,452 B1* | 7/2014 | McCloskey et al. | G06F 11/1458 |
| | | | 711/162 |
| 10,067,995 B2 | 9/2018 | Kirnak | |
| 10,324,766 B1* | 6/2019 | Karp et al. | G06F 11/3068 |
| 10,409,770 B1* | 9/2019 | Ye | G06F 16/27 |
| 10,621,147 B1* | 4/2020 | Liang et al. | G06F 16/1734 |
| 10,831,549 B1* | 11/2020 | Radhakrishnan et al. | |
| | | | G06F 9/5044 |
| 2002/0065849 A1* | 5/2002 | Ferguson et al. | H04L 9/40 |
| | | | 715/227 |
| 2002/0169520 A1* | 11/2002 | Lamkin et al. | G11B 7/268 |
| 2009/0019443 A1* | 1/2009 | Jakob | G06F 11/2097 |
| | | | 718/102 |
| 2010/0180147 A1* | 7/2010 | Beeston et al. | G06F 11/0709 |
| | | | 714/E11.023 |
| 2012/0017059 A1* | 1/2012 | Gold et al. | G06F 11/1453 |
| | | | 711/E12.103 |
| 2016/0203069 A1* | 7/2016 | Gill et al. | G06F 11/2094 |
| | | | 709/224 |
| 2016/0306822 A1* | 10/2016 | Waghulde | G06F 16/1847 |
| 2016/0371153 A1* | 12/2016 | Dornemann | G06F 11/1458 |
| 2017/0004051 A1* | 1/2017 | Ren et al. | G06F 11/1464 |
| 2019/0243702 A1* | 8/2019 | Shilane et al. | G06F 11/0709 |
| 2019/0278663 A1* | 9/2019 | Mehta et al. | G06F 3/067 |

OTHER PUBLICATIONS

U.S. Appl. No. 16/917,679, filed Jun. 30, 2020, Nikolaos Koutsikos Tsatsalmas et al.
U.S. Appl. No. 16/917,689, filed Jun. 30, 2020, Jacob Wires et al.

* cited by examiner

GRANULAR TRACKING OF REPLICATION CONSISTENCY USING SUBSETS OF ASYNCHRONOUS REPLICATION TASKS

BACKGROUND

A cloud provider, or other provider network, may implement network-based services that implement asynchronous replication of stored data. While these services may provide metrics regarding pending asynchronous replication tasks, clients of these services may need to track consistency of replication at a finer grained level. To implement this tracking, techniques for tracking completion of individual ones of a set of asynchronous replication tasks may be utilized.

While embodiments are described herein, by way of example, for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for granular tracking of replication consistency using identified subsets of asynchronous replication tasks are described herein. A cloud provider, or other provider network, may implement data storage services that include asynchronous replication of massive amounts stored data. While these services may provide metrics regarding overall asynchronous replication tasks, clients of these services may need to track consistency of replication at a finer grained level.

To generate tracking metrics for asynchronous replication, a data storage service may implement an event stream processing service, where events in the stream pertain to aspects of asynchronous replication of data. As asynchronous replication may involve very large data sets, including large replication workloads for individual clients of the service, it may be important, in some embodiments, that this event stream processing service distribute tracking workload so that performance of replication is not adversely impacted. Furthermore, as these replication workloads may significantly vary over time, dynamic reconfiguration of the event stream processing service may be needed to avoid poor utilization of provider network resource while ensuring good replication performance.

Example System Environment

Figure 1:
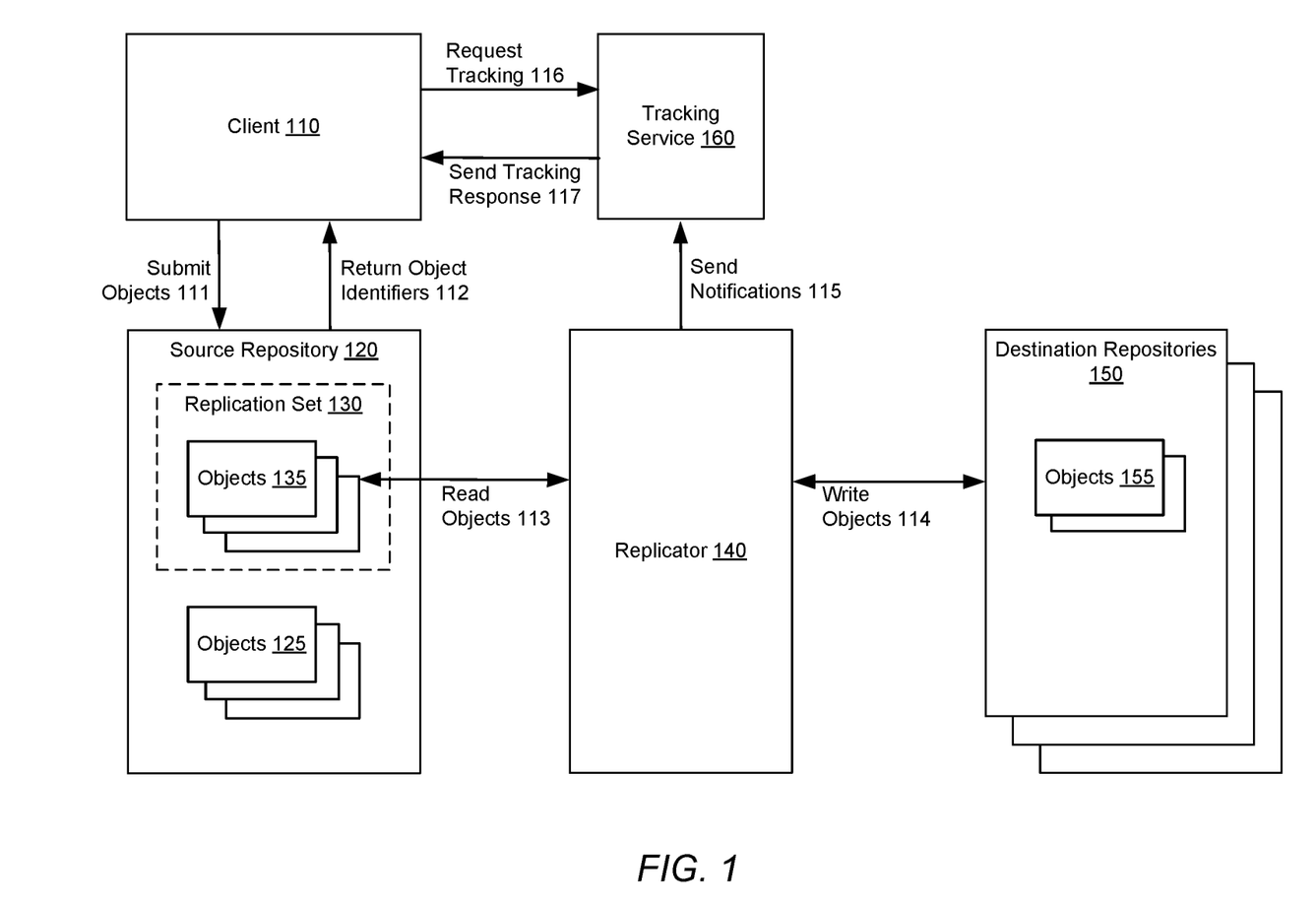
FIG. 1 illustrates an example system environment in which tracking of a set of asynchronous replication tasks may be employed, according to at least some embodiments.

FIG. 1 illustrates an example system environment in which tracking of asynchronous replication tasks may be employed, according to at least some embodiments, using the various techniques discussed below. Clients 110 of a data storage service 100 may submit objects 125 and 135 to a source repository 120 to be asynchronously replicated as a replication stream to one or more destination repositories 150, as shown in 111. Destination repositories 150 may be distributed across provider network regions, where a region may be a separate geographical area in which the provider network clusters or manages data centers, in some embodiments. Each region may include multiple availability zones (sometimes referred to as fault tolerant zones) connected to one another via a private high speed network, for example a fiber communication connection. An availability zone (also known as an availability domain, or simply a "zone") may refer to an isolated failure domain including one or more data center facilities with separate power, separate networking, and separate cooling from those in another availability zone, in some embodiments. Preferably, availability zones within a region are positioned far enough away from one another that the same natural disaster should not take more than one availability zone offline at the same time, in some embodiments. A client 110 may connect to availability zones of the provider network via a publicly accessible network (e.g., the Internet, a cellular communication network).

Responsive to receiving objects 125 and 135, the data storage service 100 may send replies to the client 110, as shown in 112, providing identifiers of individual ones of the objects, in some embodiments. A client 110 may then create a manifest including the identifiers for a subset of objects 135 included in a replication set 130 and the client may then send this manifest, as shown in 116, to a tracking service 160 to track the replication set 130 for consistency, in some embodiments.

Objects in the source repository may be replicated as an asynchronous stream of replications. Replication may be performed in parallel and may arrive at destination repositories in any order. This replication may be performed by a replicator 140 in some embodiments. The replicator 140 may access an object in the source repository 120, as shown in 113, to replicate the object to one or more of the destination repositories 140, as shown in 115, thus creating object(s) 155 in the destination repositories 150.

The replicator 140 may communicate with a tracking service 160, as shown in 115, in some embodiments. This communication may include notifications of objects enqueued by clients for replication and notifications of subsequent completions of replications of the enqueued objects. These notifications are discussed further in FIG. 3 below.

Responsive to receiving a manifest from a client 110, as shown in 116, a tracking service 160 may track a replication set 130, defined in the manifest, for consistency, in some embodiments. The tracking service 160 may communicate with the replicator 140 of the data storage service 100 to identify objects 135 to be asynchronously replicated and to track completions of those identified objects. Once the replicator 140 indicates to the tracking service 160 that all objects 135 of the replication set 130 have completed, the tracking service 160 may send an indication 117 to the client 110 of completion of replication of the replication set 130. This indication 117 may be sent to the client in any of a number of ways. In some embodiments, the indication may be sent over a same interface for which the request for tracking was submitted, such as a programmatic interface or application programming interface (API) as discussed below in FIG. 2 and FIG. 3. In other embodiments, a messaging service may be used. Examples of messaging services may include email, Short Messaging Service (SMS) and Amazon Simple Notification Service (SNS). These examples, however, are not intended to be limiting and the indication 117 may be sent to the client in any number of ways.

Figure 2:
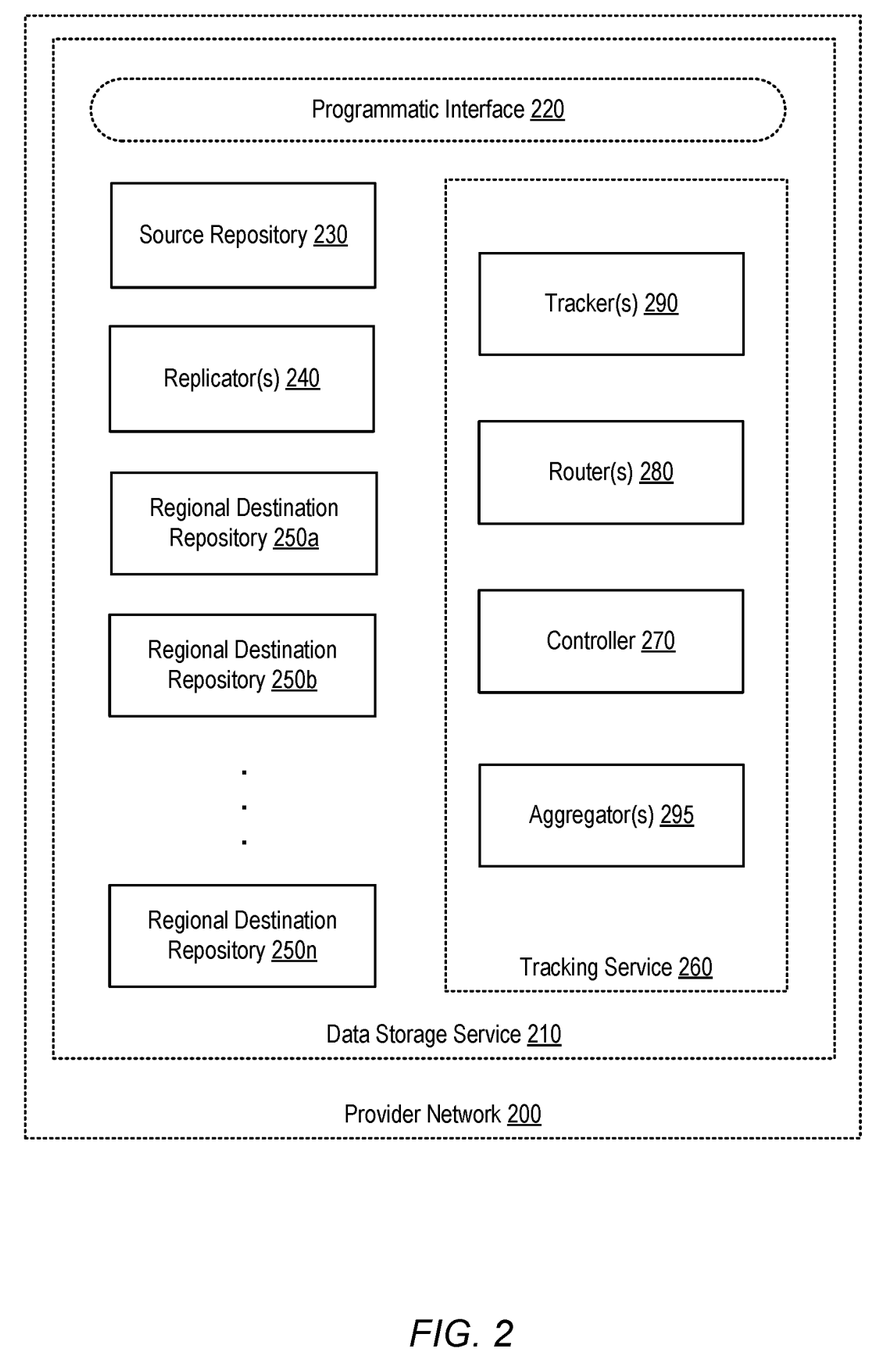
FIG. 2 a logical block diagram illustrating a provider network implementing a tracking service as part of a data storage service that performs tracking a subset of asynchronous replication tasks, according to some embodiments.

FIG. 2 a logical block diagram illustrating a provider network implementing a tracking service among other services, according to some embodiments. In various embodiments, a provider network may be a private or closed system or may be set up by an entity such as a company or a public sector organization to provide one or more services (such as various types of cloud-based storage, processing, or other computing resources) accessible via the Internet and/or other networks to clients, such as the client 110 of FIG. 1. The provider network may be implemented in a single location or may include numerous data centers hosting various resource pools, such as collections of physical and/or virtualized computer servers, storage devices, networking equipment and the like (e.g., computing device 900 described below with regard to FIG. 7), needed to implement and distribute the infrastructure and storage services offered by the provider network.

For example, the provider network (which may, in some implementations, be referred to as a "cloud provider network" or simply as a "cloud") may refer to a pool of network-accessible computing resources (such as compute, storage, and networking resources, applications, and services), which may be virtualized or bare-metal (e.g., providing direct access to underlying hardware without a virtualization platform). In this way, the provider network can provide convenient, on-demand network access to a shared pool of configurable computing resources that can be programmatically provisioned and released in response to customer commands. These resources can be dynamically provisioned and reconfigured to adjust to variable load.

The provider network can be formed as a number of regions, each including a data repository such as the regional destination repositories 250, where a region may be a separate geographical area in which the provider network clusters or manages data centers, in some embodiments. Each region may include two or more availability zones (sometimes referred to as fault tolerant zones) connected to one another via a private high speed network, for example a fiber communication connection. An availability zone (also known as an availability domain, or simply a "zone") may refer to an isolated failure domain including one or more data center facilities with separate power, separate networking, and separate cooling from those in another availability zone, in some embodiments. Preferably, availability zones within a region are positioned far enough away from one another that the same natural disaster should not take more than one availability zone offline at the same time, in some embodiments. Clients can connect to availability zones of the provider network via a publicly accessible network (e.g., the Internet, a cellular communication network).

Regions may be connected to a global network which includes private networking infrastructure (e.g., fiber connections controlled by the cloud provider) connecting each region to at least one other region, in some embodiments. The provider network may deliver content from points of presence outside of, but networked with, these regions by way of edge locations and regional edge cache servers, in some embodiments. This compartmentalization and geographic distribution of computing hardware enables the provider network to provide low-latency resource access to customers on a global scale with a high degree of fault tolerance and stability.

In some embodiments, a provider network may implement various computing resources or services across one or more regions, such as a data storage service 210, which may include data processing service(s) (e.g., map reduce, data flow, and/or other large scale data processing techniques), data storage services (e.g., object storage services, block-based storage services, various types of database services (e.g., SQL, NoSQL, document, graph, time series, and so on), blob storage, or data warehouse storage services) and/or any other type of network-based services (which may include various other types of storage, processing, analysis, communication, event handling, visualization, and security services not illustrated). The resources used to support the operations of such services (e.g., compute and storage resources) may be provisioned in an account associated with the provider network, in contrast to resources requested by users of the provider network, which may be provisioned in user accounts, in some embodiments. Such resources may include a source data repository 230, one or more replicators 240, regional data repositories 250 and resources implementing a tracking service 260, including a controller 270, routers 280, trackers 290 and one or more aggregators 295, in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computing device 900 illustrated in FIG. 7 and described below. In various embodiments, the functionality of a given system or service component (e.g., a component of data storage service 210) may be implemented by a particular node or may be distributed across several nodes. In some embodiments, a given node may implement the functionality of more than one service system component (e.g., more than one data store component).

Data storage service 210 may implement techniques for tracking sets of related asynchronous replication tasks for consistency, as discussed above with regard to FIG. 1 and below with regard to FIGS. 3 - 6. Data storage service 210 may implement a source repository 230 at a region of the provider network 200. Clients, such as the client 110 of FIG. 1, may submit data objects, along with information identifying destination repositories, to the data storage service 210 for asynchronous replication via a programmatic interface 220, as shown in 111 of FIG. 1. The programmatic interface 220 may be any suitable interface for requesting such replications and may include application programming interfaces (APIs), messaging and web services although these are merely examples and are not intended to be limiting.

For example, a network-based service may have an interface described in a machine-processable format, such as the Web Services Description Language (WSDL). Other systems may interact with a web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

In some embodiments, responsive to these requests for replication, the data storage service 210 may return identifiers of asynchronous replication tasks, as shown in 112 of FIG. 1, and may also notify a tracking service 260 of one or more pending asynchronous replications, as discussed further below in FIG. 3.

Data storage service 210 may implement one or more regional destination repositories 250 at a region of the provider network 200, such as the regional destination repositories 150 in FIG. 1, in some embodiments. These destination repositories may serve as destinations for asynchronous replication operations requested by clients, such as the client 110 of FIG. 1.

Data storage service 210 may implement one or more replicators 240, such as the replicator 140 in FIG. 1, in some embodiments. These replicators may asynchronously replicate data objects on behalf of clients from the source respository 230 to regional destination repositories 250 and may additionally provide notifications to a tracking service 260, in some embodiments.

Data storage service 210 may implement a tracking service 260, such as the replicator 160 in FIG. 1, in some embodiments to provide tracking of asynchronous replication tasks. The tracking service may further include a controller 270, routers 280, trackers 290 and one or more aggregators 295, in some embodiments. The operation of the tracking service is discussed in further detail below in FIG. 3.

Tracking service 260 may implement a controller 270 in some embodiments. The controller 270 may serve to coordinate tracking requests and send indications of completions of replication sets, as discussed further below in FIGS. 3 - 6.

Tracking service 260 may implement one or more routers 280 in some embodiments. The routers 280 may serve to route tracking manifests and notifications to trackers 290 and maintain routing tables and routing schemes to perform these routing operations, as discussed further below in FIGS. 3 - 6.

Tracking service 260 may implement one or more trackers 290 in some embodiments. The trackers 290 may track progress of individual asynchronous replication tasks as identified by manifests received at the trackers 290 from the routers 280. In some embodiments, the trackers 290 may further provide notifications of replication completion to one or more aggregators 295. The function of the trackers 290 are discussed further below in FIGS. 3 - 6.

Tracking service 260 may implement one or more aggregators 295 in some embodiments. The aggregators 295 may aggregate completions of individual asynchronous replication tasks responsive to notifications sent by trackers 290. The function of the aggregators 295 are discussed further below in FIGS. 3 - 6.

Figure 3:
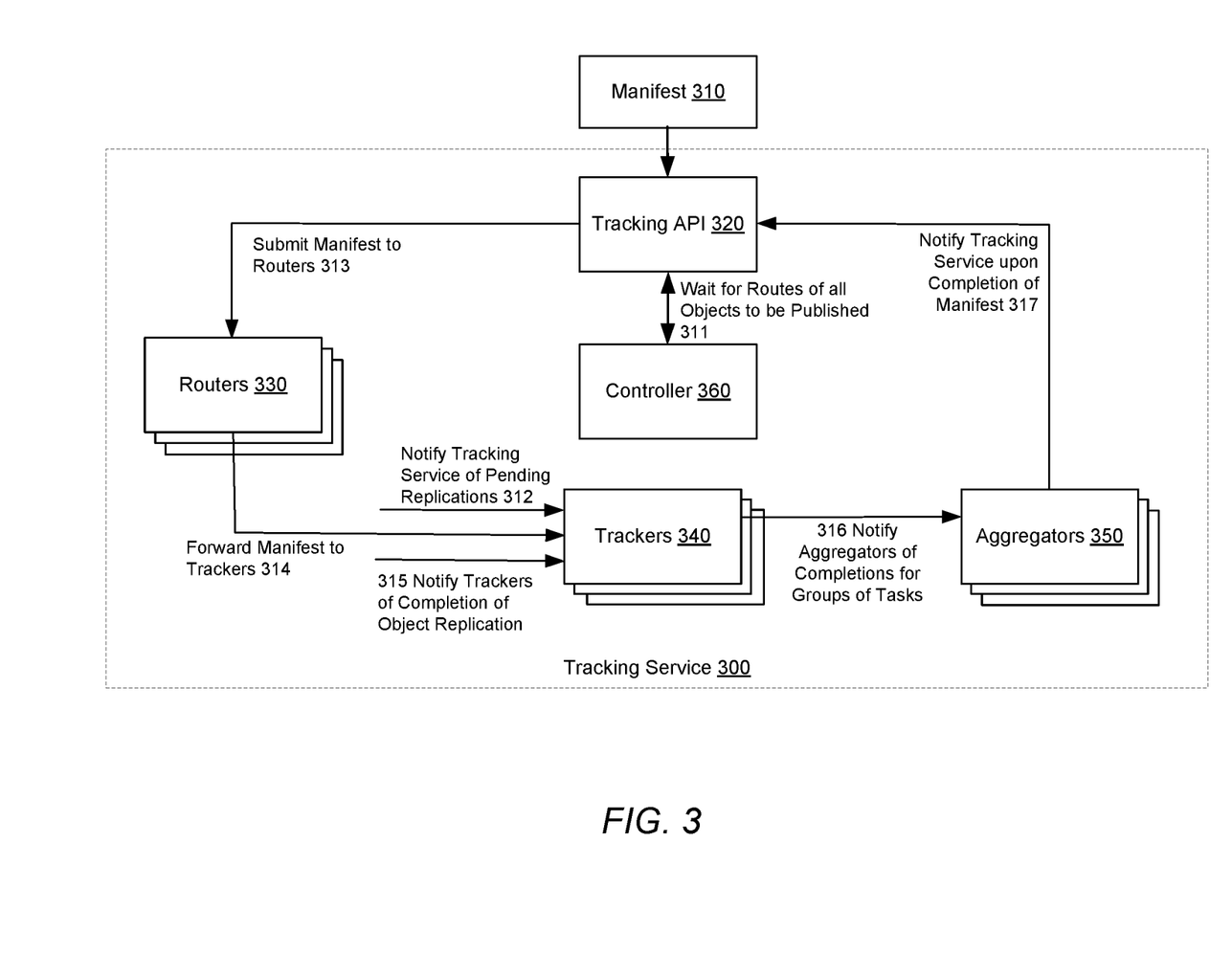
FIG. 3 is a logical block diagram illustrating data flow among various cs of a tracking service, according to some embodiments.

FIG. 3 is a logical block diagram illustrating data flow among various elements of a tracking service, such as the tracking service 160 of FIG. 1 and tracking service 260 of FIG. 2, according to some embodiments. A client, such as the client 110 of FIG. 1, may submit a manifest 310 to the tracking service through a tracking API 320. Examples of the tracking API 320 may include application programming interfaces (APIs), messaging and web services although these are merely examples and are not intended to be limiting.

For example, a network-based service may have an interface described in a machine-processable format, such as the Web Services Description Language (WSDL). Other systems may interact with a web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The manifest 310 may include identifiers of asynchronous replication tasks, defining a replication set such as the replication set 130 of FIG. 1, to be tracked for consistency, in some embodiments. Responsive to receipt of the manifest 310, the tracking service 300 may wait for routes for all replication tasks in the replication set to be published, as shown in 311.

Once all routes for asynchronous replication tasks in the replication set have been published, the manifest may be submitted to the routers 330, as shown in 313, for further distribution to the trackers 340, as shown in 314.

Individual ones of the trackers may then track respective assigned asynchronous replication tasks and receive notifications of pending replications 312 and replication completions 315, such as is indicated in 115 of FIG. 1. Upon determining completion of asynchronous replication task at an assigned tracker, the tracker may consolidate determined completions of multiple tracked tasks and notify one or more aggregators 350, such as aggregator(s) 295 of FIG. 2, of completion of a group of asynchronous replication tasks as shown in 316, according to some embodiments.

Upon determination of completion of all asynchronous replication tasks of the replication set, the tracking service 300 may then receive notification of the completion of the manifest as shown in 317, in some embodiments.

Dynamic Configuration of a Tracking Service

As asynchronous replication may involve very large data sets, including large replication workloads for individual clients of s data storage service, it may be important, in some embodiments, that a tracking service distribute tracking workloads such that performance of replication is not adversely impacted. Furthermore, as replication workloads may significantly vary over time, dynamic reconfiguration of the tracking service may be needed to avoid poor utilization of provider network resource while ensuring good replication performance.

To accommodate dynamic reconfiguration of a tracking service, individual ones of asynchronous replication tasks are assigned sequence numbers according to the order in which the tasks were created, in some embodiments. These sequence numbers may be included in respective identifiers of the tasks provided to the client requesting the replication task responsive to the request for creation, such as is indicated in 112 of FIG. 1. These identifiers may be subsequently included in a manifest, such as the manifest 310 of FIG. 3, defining a replication set to track. Furthermore, notifications for a particular asynchronous replication task, such as notifications set in 115 of FIG. 1 and 312 and 315 of FIG. 3, may use the same identifier, ensuring that routing of the notifications is consistent.

A manifest defining a replication set may, therefore, include a set of creation sequence numbers corresponding to the creation times of the respective ones of asynchronous replication tasks in the replication set. Included in this set of creation sequence numbers may be a newest sequence number correlating to the asynchronous replication task most recently created, in some embodiments.

In some embodiments, a routing table may be published according to this newest sequence number. This routing table may define a routing scheme ensuring that notifications for individual ones of the asynchronous replication tasks may always be routed to the same router in a dynamically changing fleet of routers. Once published, a routing table may be invariant and valid indefinitely, but may only be used to route notifications originating within a defined time window. Routers, such as routers 330 of FIG. 3, may request routing tables whenever they receive notifications with sequence numbers outside of time windows covered by routing tables they have previously obtained, in some embodiments.

Through the use of creation sequence numbers and publishing of routing tables defining stable routing schemes, the configuration of various elements, including trackers 340 and aggregators 350 of FIG. 3, may vary dynamically responsive to changing replication demand while ensuring stable routing of notifications for tracking of individual replication sets for consistency.

Tracking Consistency of a Set of Asynchronous Replication Tasks

Figure 4:
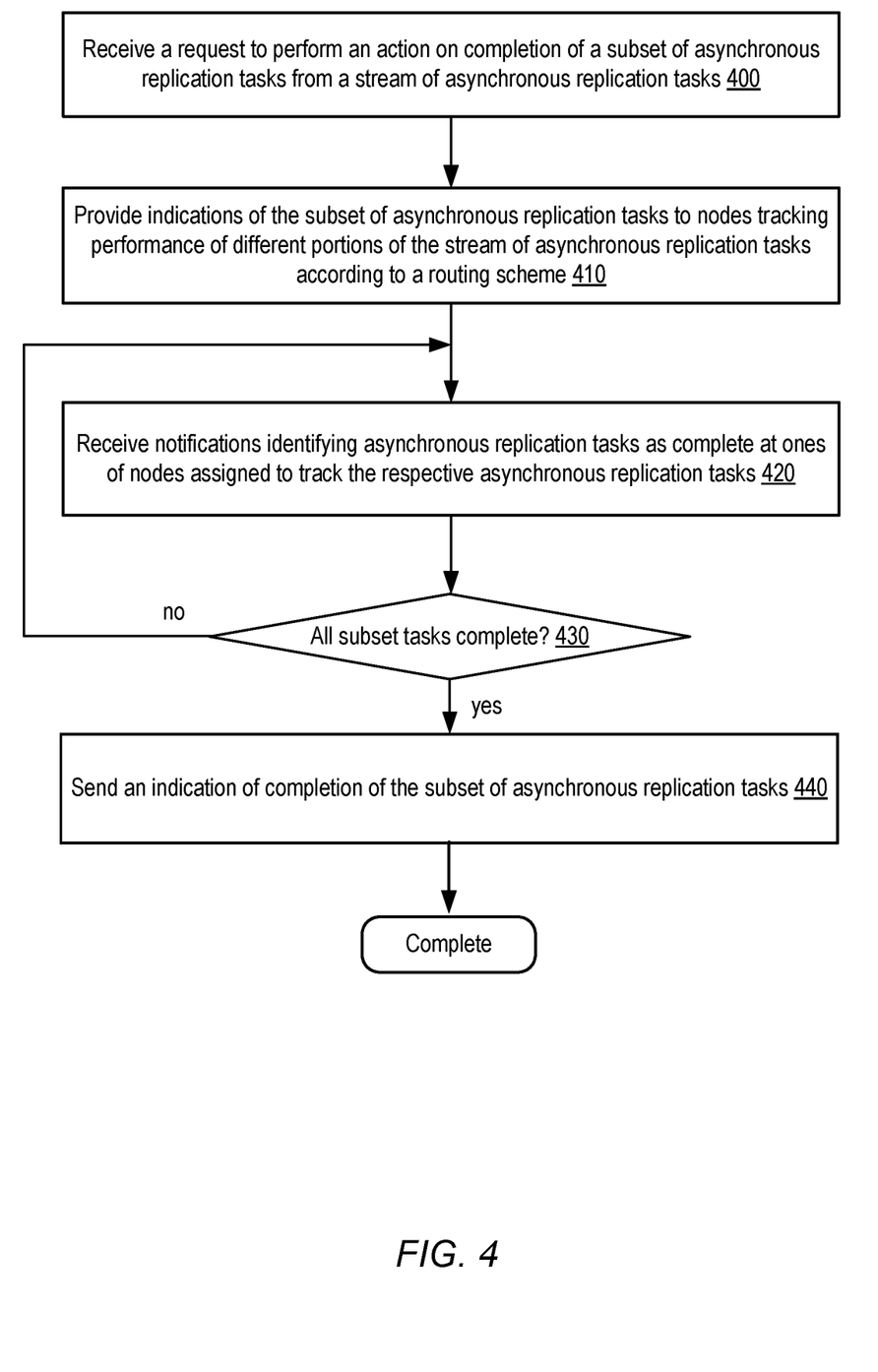
FIG. 4 is a high-level flowchart illustrating various methods and techniques to implement consistency tracking of a subset of asynchronous replication tasks, according to some embodiments.

FIG. 4 is a high-level flowchart illustrating various methods and techniques to implement consistency tracking of a set of asynchronous replication tasks, according to some embodiments. The process begins at step 400 where a request to perform an action on completion of a subset of asynchronous replication tasks from a stream of asynchronous replication tasks may be received, such as at a tracking service 160 of FIG. 1 in some embodiments. An example of a specific action to be performed may be to send a notification of completion of the subset of asynchronous replication tasks in some embodiments, although other actions may be performed and such as example is not intended to be limiting.

The request to be notified may include a manifest, in some embodiments, defining the subset of asynchronous replication tasks, such as the manifest 310 in FIG. 3, and may be received through an appropriate interface to the tracking service, such as though a programmatic interface 220 as shown in FIG. 2 or the tracking API 320 as shown in FIG. 3. In some embodiments, the manifest may include identifiers for each of the subset of asynchronous replication tasks, where each identifier includes a sequence number indicating the time when the asynchronous replications task was created. These sequence numbers may be used to support dynamic configuration of tracking of asynchronous replication tasks, as discussed above.

Once the request is received, the process proceeds to step 410 where indications of the subset of asynchronous replication tasks may be provided, in some embodiments, to nodes tracking performance of different portions of the stream of asynchronous replication tasks according to a routing scheme. Examples of such nodes are the trackers 290 of FIG. 2 and the trackers 340 as shown in FIG. 3. In some embodiments, a fleet of tracking nodes may be employed to distribute the tracking workload, according to the routing scheme, for the stream of asynchronous replication tasks such that replication and tracking performance may be minimally impacted.

Once tracking nodes have received indications of the subset of asynchronous replication tasks to be tracked, notifications of completion of individual ones of the subset of asynchronous replication tasks may be received, in some embodiments, at respective ones of the nodes assigned to track the respective asynchronous replication tasks, as shown in step 420. In some embodiments, these notifications may originate at one or more replicators, such as the replicator 140 of FIG. 1 and replicator(s) 240 of FIG. 2, and may be sent through routers, such as router(s) 280 of FIG. 2 and routers 330 of FIG. 3 to respective tracking nodes according to the routing scheme. This sending of notifications through routers to respective tracking nodes is not intended to be limiting, and various means of delivering completion notifications to the tracking nodes may be employed.

Once all tasks of the subset of asynchronous replication tasks are indicated as complete, as shown in step 430, the process advances to step 440 where an indication of completion of the subset of asynchronous replication tasks may be sent. The process is then complete.

Figure 5:
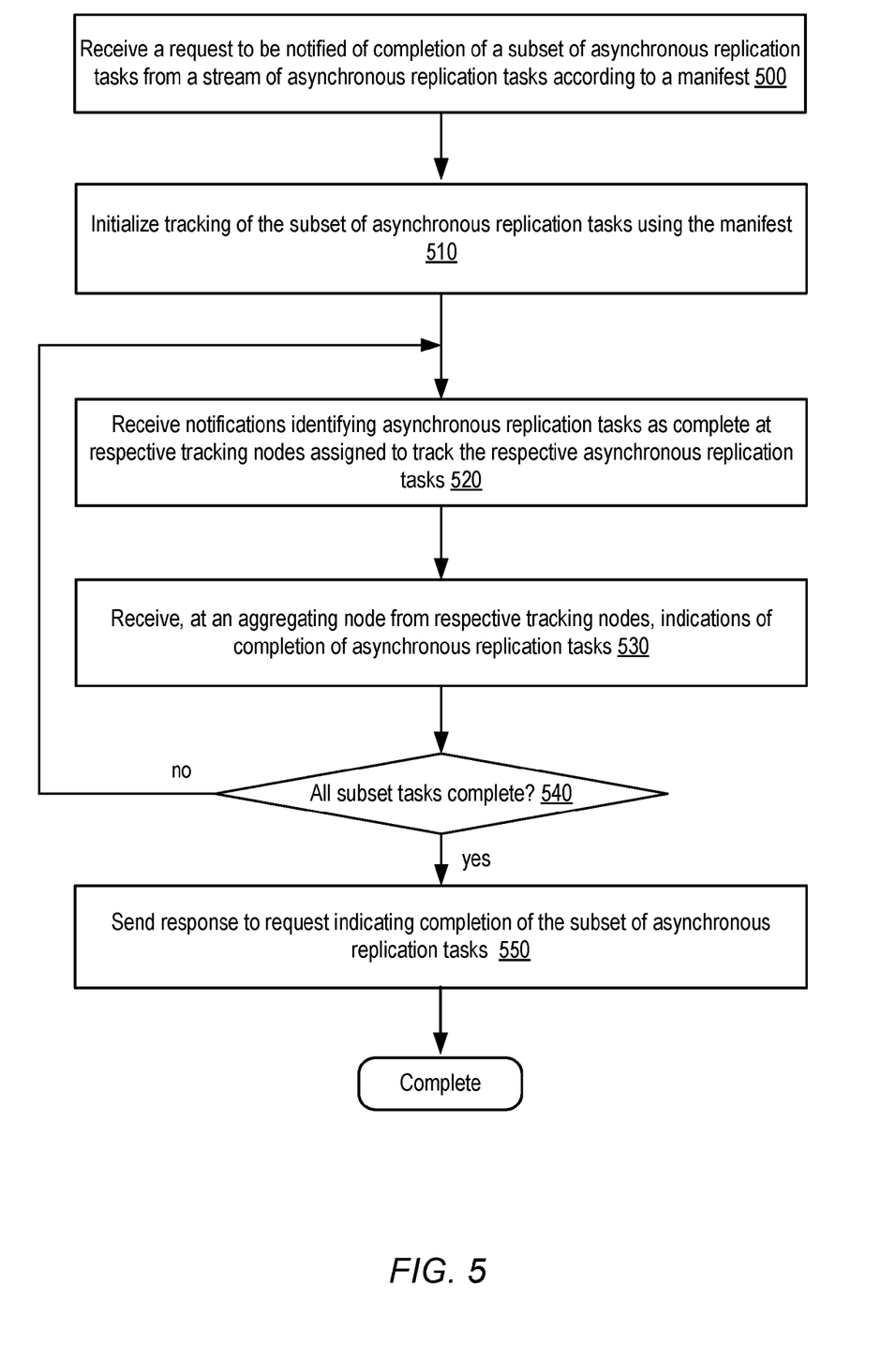
FIG. 5 is a high-level flowchart illustrating various methods and techniques to implement consistency tracking of a set of asynchronous replication tasks using a manifest, according to some embodiments.

FIG. 5 is a high-level flowchart illustrating various methods and techniques to implement consistency tracking of a set of asynchronous replication tasks using a manifest, according to some embodiments. The process begins at step 500 where a request to be notified of completion of a subset of asynchronous replication tasks from a stream of asynchronous replication tasks may be received, such as at a tracking service 160 of FIG. 1 in some embodiments. This request may include a manifest, in some embodiments, defining the subset of asynchronous replication tasks, such as the manifest 310 in FIG. 3, and may be received through an appropriate interface to the tracking service, such as though a programmatic interface 220 as shown in FIG. 2 or the tracking API 320 as shown in FIG. 3.

The request to be notified may include a manifest, in some embodiments, defining the subset of asynchronous replication tasks, such as the manifest 310 in FIG. 3, and may be received through an appropriate interface to the tracking service, such as though a programmatic interface 220 as shown in FIG. 2 or the tracking API 320 as shown in FIG. 3. In some embodiments, the manifest may include identifiers for each of the subset of asynchronous replication tasks, where each identifier includes a sequence number indicating the time when the asynchronous replications task was created. These sequence numbers may be used to support dynamic configuration of tracking of asynchronous replication tasks, as discussed above.

Once the request is received, the process proceeds to step 510 where tracking of the subset of asynchronous replication tasks may be initialized. Further details of this initialization are discussed below in FIG. 7.

Once tracking of the subset of asynchronous replication tasks has been initialized, notifications of completion of individual ones of the subset of asynchronous replication tasks may be received, in some embodiments, at respective ones of the nodes assigned to track the respective asynchronous replication tasks, as shown in step 520. In some embodiments, these notifications may originate at one or more replicators, such as the replicator 140 of FIG. 1 and replicator(s) 240 of FIG. 2, and may be sent through routers, such as router(s) 280 of FIG. 2 and routers 330 of FIG. 3 to respective tracking nodes according to the routing scheme. This sending of notifications through routers to respective tracking nodes is not intended to be limiting, and various means of delivering completion notifications to the tracking nodes may be employed.

As completion notifications are received at individual ones of the tracking nodes, step 530 show that an aggregating node may receive indications of completion for the respective asynchronous replication tasks from those nodes, in some embodiments. Examples of this aggregating node include the aggregator(s) 295 of FIG. 2 and the aggregators 350 of FIG. 3. In some embodiments, by distributing the tracking workload between the tracking nodes and one or more aggregating nodes, performance of the tracking service may be further optimized.

Once all tasks of the subset of asynchronous replication tasks are indicated as complete at the aggregating node, as shown in step 540, the process advances to step 550 where an indication of completion of the subset of asynchronous replication tasks may be sent. The process is then complete.

Figure 6:
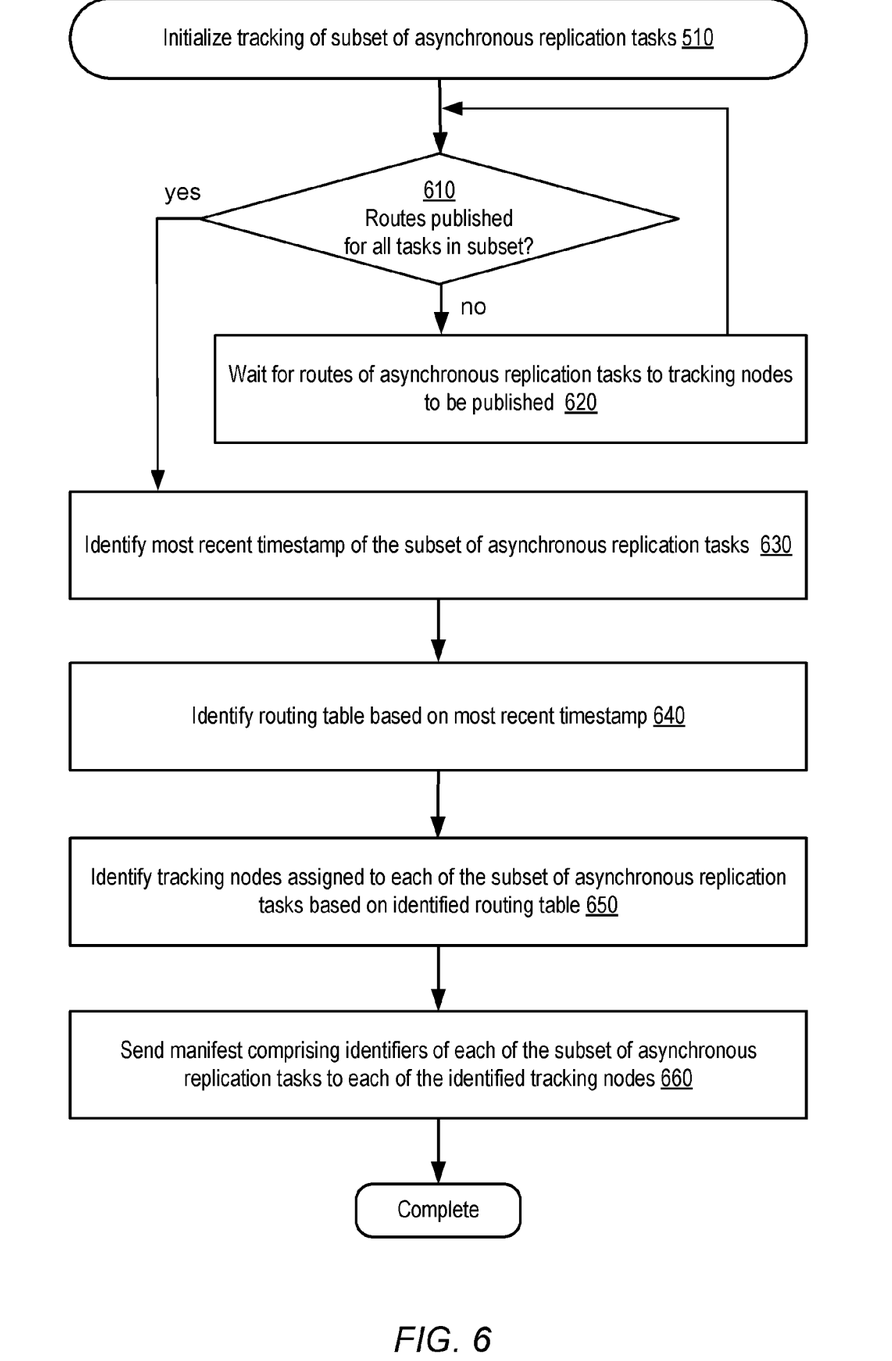
FIG. 6 is a high-level flowchart illustrating various methods and techniques to implement initializing tracking of a set of asynchronous replication tasks, according to some embodiments.

FIG. 6 is a high-level flowchart illustrating various methods and techniques to implement initializing tracking of a set of pending asynchronous replication tasks, according to some embodiments.

As individual ones of a stream of asynchronous replication tasks are received at a source repository, such as replication tasks for objects 125 and 135 at source repository 120 of FIG. 1, notifications of pending asynchronous replication tasks, as shown in 620, may be received at a tracking service, such as is shown in 312 of FIG. 3. As these notifications are received, a node may assigned to track the respective asynchronous replication task and a route may be established to the assigned node. In some embodiments, the route may identified based on the identifier of the asynchronous replication task, the identifier including the sequence number indicating the time when the asynchronous replications task was created. Routes for individual ones of the stream of asynchronous replication tasks may be entered routing tables, in some embodiments.

The process may wait for publication of routes for all asynchronous replication tasks in the defined subset described in the received manifest, according to some embodiments. Once all notifications have been received, as shown in 610 and 620, the process advances to step 630.

A most recent sequence number of the respective identifiers of individual ones of the subset of asynchronous replication tasks may then be identified in some embodiments, as shown in 630. This most recent sequence number may then be used to identify a routing table for a routing scheme which may be used for subsequent tracking of the subset of asynchronous replication tasks, as shown in 640.

Respective tracking nodes for individual ones of the subset of asynchronous replication tasks may then be identified using the routing scheme of the identified routing table in some embodiments, as shown in step 650.

Once the respective tracking nodes have been identified, the manifest may be sent, as shown in 660, to each of the respective tracking nodes in some embodiments, such as shown in 314 of FIG. 3. Once all tracking nodes for individual ones of the asynchronous replication tasks have received the manifest, tracking of the subset of asynchronous replication tasks has been initialized.

The process begins at step 600 where a request to be notified of completion of a subset of asynchronous replication tasks from a stream of asynchronous replication tasks may be received, such as at a tracking service 160 of FIG. 1 in some embodiments.

Illustrative Computer System

Figure 7:
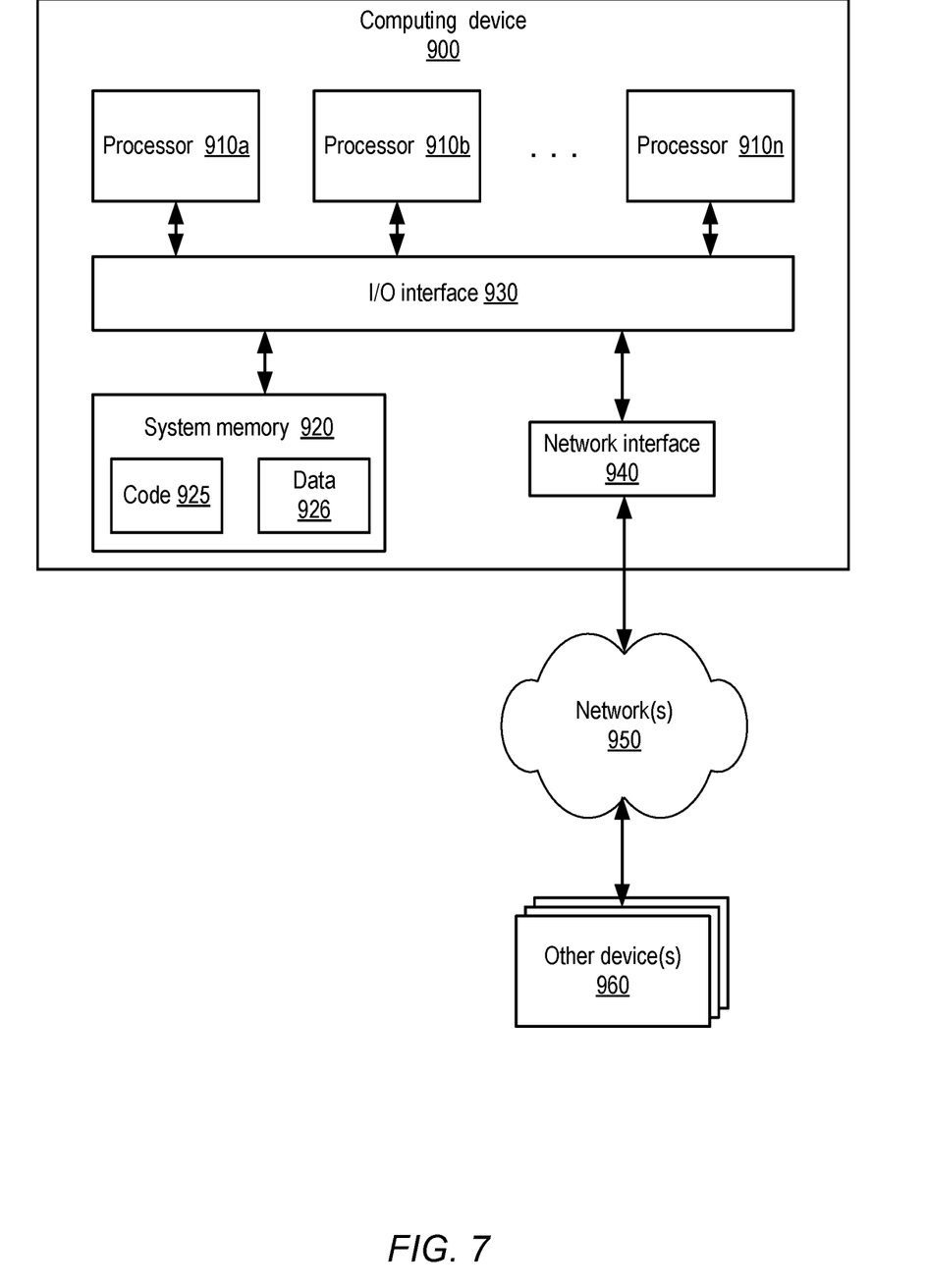
FIG. 7 is a block diagram illustrating an example computing device that may be used in at least some embodiments.

In at least some embodiments, a server that implements a portion or all of one or more of the technologies described herein may include a general-purpose computer system that includes or is configured to access one or more computer-accessible media. FIG. 7 illustrates such a general-purpose computing device 900. In the illustrated embodiment, computing device 900 includes one or more processors 910 coupled to a system memory 920 (which may comprise both non-volatile and volatile memory modules) via an input/output (I/O) interface 930. Computing device 900 further includes a network interface 940 coupled to I/O interface 930.

In various embodiments, computing device 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA. In some implementations, graphics processing units (GPUs) may be used instead of, or in addition to, conventional processors.

System memory 920 may be configured to store instructions and data accessible by processor(s) 910. In at least some embodiments, the system memory 920 may comprise both volatile and non-volatile portions; in other embodiments, only volatile memory may be used. In various embodiments, the volatile portion of system memory 920 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces such as various types of persistent and/or volatile storage devices. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computing device 900 and other devices 960 attached to a network or networks 950, such as other computer systems or devices as illustrated in FIG. 1 and FIG. 6, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIG. 1 and FIG. 6 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 900 via I/O interface 930. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of methods may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

at least one processor; and a memory, storing program instructions that when executed cause the at least one processor to implement a data storage service configured to:

receive a request to be notified upon completion of a specified subset of asynchronous replication tasks of a stream of asynchronous replication tasks, wherein the stream of asynchronous replication tasks perform operations to replicate data objects placed in a first location in the data storage service to a second location in the data storage service, wherein the subset of asynchronous replication tasks is specified in a received manifest that identifies particular data objects placed in the first location, and wherein the subset of asynchronous replication tasks comprises two or more asynchronous replication tasks of the stream of asynchronous replication tasks;

receive notifications identifying individual ones of the stream of asynchronous replication tasks as pending, the notifications comprising respective identifiers of individual ones of the stream of asynchronous replication tasks;

responsive to determining that the specified subset of asynchronous replication tasks is pending, provide an indication of the specified subset of asynchronous replication tasks to different nodes that track performance of different portions of the stream of asynchronous replication tasks according to a routing scheme;

receive respective completion notifications from one or more nodes of the different nodes that indicate completion of individual ones of the specified subset of asynchronous replication tasks routed to the one or more nodes according to the routing scheme; and responsive to determining that the specified subset of asynchronous replication tasks is complete from the received completion notifications, send an indication of completion of the subset of asynchronous replication tasks.

2. The system of claim 1, the data storage service further configured to:

aggregate, at an aggregator node of the data storage service, notifications of groups of completions of asynchronous replication tasks received at the one or more tracking nodes of the data storage service.

3. The system of claim 1, wherein the identifiers of individual ones of the stream of asynchronous replication tasks comprise a sequence number corresponding to creation time of the asynchronous replication task for execution.

4. The system of claim 3, the data storage service further configured to:

select a routing table using a most recent sequence number of the subset of one or more asynchronous replication tasks;

identify, based at least in part on the selected routing table, the one or more nodes of the different nodes receiving the respective completion notifications; and send a manifest comprising the identifiers of the subset of one or more asynchronous replication tasks to individual ones of the one or more identified nodes;

wherein the routing table is one of a plurality of routing tables of the tracking service corresponding to respective different time periods; and wherein the tracking service comprises different nodes for the respective different time periods.

5. A method, comprising:

receiving a request to perform an action upon completion of a specified subset of asynchronous replication tasks from a stream of asynchronous replication tasks performed over a network that replicate data objects in a first data store to at least a second data store, wherein the specified subset of asynchronous replication tasks comprises two or more asynchronous replication tasks of the stream of asynchronous replication tasks;

providing indications of the specified subset of asynchronous replication tasks to different nodes that track performance of different portions of the stream of asynchronous replication tasks according to a routing scheme;

receiving respective completion notifications at one or more nodes of the different nodes that indicate completion of individual ones of the specified subset of asynchronous replication tasks routed to the one or more nodes according to the routing scheme; and responsive to determining that the specified subset of asynchronous replication tasks is complete from the received completion notifications, performing the action.

6. The method of claim 5, further comprising:

receiving respective notifications identifying individual ones of the stream of asynchronous replication tasks as pending, the respective notifications comprising respective identifiers of the individual ones of the stream of asynchronous replication tasks; and responsive to receiving the request to be notified upon completion of the subset of one or more asynchronous replication tasks, matching respective identifiers of individual ones of the specified subset of asynchronous replication tasks with respective identifiers of the individual ones of the stream of asynchronous replication tasks.

7. The method of claim 6, wherein the identifiers of the individual ones of the stream of asynchronous replication tasks comprise a sequence number corresponding to creation time of the asynchronous replication task for execution.

8. The method of claim 6, wherein respective notifications for individual ones of the stream of asynchronous replication tasks are routed to respective individual ones of the different nodes that track performance of different portions of the stream of asynchronous replication tasks according to the respective identifiers of the individual ones of the stream of asynchronous replication tasks.

9. The method of claim 8, further comprising:

aggregating, at an aggregator node, notifications for groups of completions of asynchronous replication tasks received at the one or more nodes of the different nodes.

10. The method of claim 9, further comprising:

selecting a routing table using a most recent sequence number of the subset of one or more asynchronous replication tasks;

identifying, based at least in part on the selected routing table, the one or more nodes of the different nodes receiving the respective completion notifications; and sending a manifest comprising the identifiers of the subset of one or more pending asynchronous replication tasks to individual ones of the one or more identified one or more nodes.

11. The method of claim 10, wherein the routing table is one of a plurality of routing tables corresponding to respective different time periods; and wherein a different number of nodes are used for individual ones of the different time periods.

12. The method of claim 5, wherein the stream of asynchronous replication tasks replicate data from respective source nodes in a source region to respective destination nodes of respective destination regions of a data storage service of a provider network;

wherein the source region and destination regions are network regions of the provider network; and wherein the respective destination regions are in different than the source region.

13. One or more non-transitory, computer-readable storage media, storing program instructions that when executed on or across one or more computing devices cause the one or more computing devices to implement a data storage service that implements:

receiving, at a data storage service, a request to perform an action upon completion of a specified subset of asynchronous replication tasks from a stream of asynchronous replication tasks, wherein the subset of asynchronous replication tasks comprises two or more asynchronous replication tasks of the stream of asynchronous replication tasks, and wherein the request comprises a manifest of indications of the specified subset of asynchronous replication tasks, wherein the stream of asynchronous replication tasks perform operations to replicate data objects placed in a first location in the data storage service to a second location in the data storage service;

providing the manifest to different nodes that track performance of different portions of the stream of asynchronous replication tasks according to a routing scheme;

receiving respective completion notifications from one or more nodes of the different nodes that indicate completion of individual ones of the specified subset of asynchronous replication tasks routed to the one or more nodes according to the routing scheme; and responsive to determining that the specified subset of asynchronous replication tasks is complete from the received completion notifications, performing the action.

14. The one or more non-transitory, computer-readable storage media of claim 13, wherein the data storage service further implements:

receiving notifications identifying individual ones of the stream of asynchronous replication tasks as pending, the notifications comprising respective identifiers of individual ones of the stream of asynchronous replication tasks;

responsive to receiving the request to be notified upon completion of the subset of one or more asynchronous replication tasks, matching respective identifiers of individual ones of the subset of asynchronous replication tasks within the manifest to respective identifiers of the individual ones of the stream of asynchronous replication tasks.

15. The one or more non-transitory, computer-readable storage media of claim 14, wherein the identifiers of individual ones of the stream of asynchronous replication tasks comprise a sequence number corresponding to creation time of the asynchronous replication task for execution.

16. The one or more non-transitory, computer-readable storage media of claim 14, wherein respective notifications for individual ones of the stream of asynchronous replication tasks are routed to respective individual ones of the different nodes that track performance of different portions of the stream of asynchronous replication tasks according to the respective identifiers of the individual ones of the stream of asynchronous replication tasks.

17. The one or more non-transitory, computer-readable storage media of claim 16, wherein the data storage service further implements:

aggregating, at an aggregator node, completion notifications received at the one or more nodes of the different nodes.

18. The one or more non-transitory, computer-readable storage media of claim 17, wherein the data storage service further implements:

selecting a routing table using a most recent sequence number of the subset of one or more asynchronous replication tasks;

identifying, based at least in part on the selected routing table, the one or more nodes of the different nodes receiving the respective completion notifications; and sending the manifest to individual ones of the one or more identified one or more nodes.

19. The one or more non-transitory, computer-readable storage media claim 18, wherein the routing table is one of a plurality of routing tables of the data storage service corresponding to respective different time periods; and wherein the data storage service comprises a different number of nodes for the respective different time periods.

20. The one or more non-transitory, computer-readable storage media of claim 13, wherein the data storage service is part of a provider network;

wherein the stream of asynchronous replication tasks replicate data from respective source nodes in a source region to respective destination nodes of respective destination regions;

wherein the respective source nodes and respective destinations nodes are part of the database service;

wherein the source region and destination regions are network regions of the provider network; and wherein the respective destination regions are in different than the source region.

* * * * *